United States Patent
Merdivan et al.

(10) Patent No.: US 10,565,508 B2
(45) Date of Patent: Feb. 18, 2020

(54) INFERRED FACTS DISCOVERED THROUGH KNOWLEDGE GRAPH DERIVED CONTEXTUAL OVERLAYS

(71) Applicant: International Business Machines Corporation, Armonk, NY (US)

(72) Inventors: Erinc Merdivan, Dublin (IE); John A. Riendeau, Atlanta, GA (US); Michael D. Whitley, Durham, NC (US); Le Zhang, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1022 days.

(21) Appl. No.: 14/568,209

(22) Filed: Dec. 12, 2014

(65) Prior Publication Data
US 2016/0171376 A1    Jun. 16, 2016

(51) Int. Cl.
| | | |
|---|---|---|
| G06F 17/00 | (2019.01) | |
| G06F 17/20 | (2006.01) | |
| G06N 5/04 | (2006.01) | |
| G06N 7/00 | (2006.01) | |
| G06N 20/00 | (2019.01) | |

(52) U.S. Cl.
CPC .............. *G06N 5/04* (2013.01); *G06N 7/005* (2013.01); *G06N 20/00* (2019.01)

(58) Field of Classification Search
CPC .. G06N 5/04; G06N 7/02; G06N 5/02; G06N 5/048
See application file for complete search history.

(56) References Cited

U.S. PATENT DOCUMENTS

| | | | |
|---|---|---|---|
| 5,251,131 A | * | 10/1993 | Masand .............. G06F 17/2785 704/9 |
| 7,580,922 B2 | | 8/2009 | Friedlander et al. |
| 9,069,858 B1 | * | 6/2015 | Talmor ................ G06F 16/9535 |
| 2003/0028564 A1 | * | 2/2003 | Sanfilippo ......... G06F 17/30684 715/200 |
| 2007/0174252 A1 | | 7/2007 | Rawlings et al. |
| 2010/0153094 A1 | | 6/2010 | Lee et al. |
| 2011/0022429 A1 | * | 1/2011 | Yates .................... G06Q 10/00 705/313 |

(Continued)

FOREIGN PATENT DOCUMENTS

| | | |
|---|---|---|
| CN | 1489089 | 4/2004 |
| CN | 104050256 | 9/2014 |

OTHER PUBLICATIONS

On the Effective Use of Cyc in a Question Answering System Jon Curtis et al, KRAQ'05—IJCAI workshop—Jul. 30, 2005.*

(Continued)

*Primary Examiner* — Luis A Sitiriche
(74) *Attorney, Agent, or Firm* — VanLeeuwen & VanLeeuwen; Diana R. Gerhardt

(57) ABSTRACT

An approach is provided in which a knowledge manager identifies a first cohort type and a second cohort type corresponding to an entity included in a question. The knowledge manager determines inferred states to the question by comparing a first set of cohort attributes corresponding to a first cohort type against entity attributes corresponding to the question. In turn, the knowledge manager generates possible answers by comparing the inferred states against a second set of cohort attributes corresponding to a second cohort type.

12 Claims, 10 Drawing Sheets

(56) References Cited

U.S. PATENT DOCUMENTS

| | | | |
|---|---|---|---|
| 2012/0078888 A1 | 3/2012 | Brown et al. | |
| 2012/0197862 A1* | 8/2012 | Woytowitz | G06F 16/36 707/710 |
| 2013/0166530 A1* | 6/2013 | Pilat | G06F 17/30873 707/708 |
| 2014/0122389 A1 | 5/2014 | Riskin | |
| 2014/0222719 A1 | 8/2014 | Poulin et al. | |
| 2014/0244550 A1* | 8/2014 | Jin | G06N 7/005 706/12 |
| 2015/0161230 A1* | 6/2015 | Alkov | G06F 17/30705 707/737 |
| 2015/0379414 A1* | 12/2015 | Yeh | G06N 5/022 706/11 |

OTHER PUBLICATIONS

Knowledge and Reasoning for Answering Questions Workshop associated with IJCAI05, Edinburgh, Jul. 30, 2005 KRAQ'05—IJCAI workshop—Jul. 30, 2005.*

Merdivan et al., "Inferred Facts Discovered through Knowledge Graph Derived Contextual Overlays," U.S. Appl. No. 15/076,384, filed Mar. 22, 2016, 41 pages.

"List of IBM Patents or Patent Applications Treated as Related," Letter from Leslie A. Van Leeuwen, Mar. 22, 2016, 1 page.

International Search Report and Written Opinion for International Application No. PCT/IB2015/059173, dated Mar. 24, 2016, 11 pages.

* cited by examiner

INFERRED FACTS DISCOVERED THROUGH KNOWLEDGE GRAPH DERIVED CONTEXTUAL OVERLAYS

BACKGROUND

A question answer system answers questions posed in a natural language format by applying advanced natural language processing, information retrieval, knowledge representation, automated reasoning, and machine learning technologies. Question answer systems differ from typical document search technologies because document search technologies generate a list of documents ranked in order of relevance based on a word query, whereas question answer systems analyze contextual details of a question expressed in a natural language and provide a precise answer to the question.

System developers typically train question answer systems for specific domains to provide relevant answers to domain-specific questions (e.g., financial domain, medical domain, travel domain, etc.). One approach to train a question answer system is for a set of experts to input detailed domain training knowledge into a knowledge base that, in turn, the question answer system utilizes to answer questions. Another approach to training a question answer system is to ingest a large set of corpora from trusted, traditional sources (textbooks, journals, etc.) into the question answer system's knowledge base, which the question answer system utilizes to answer questions.

A question answer system's ability to answer a question depends upon whether facts corresponding to the answer are located in the knowledge base. If facts do not exist in the knowledge base to answer a question, the question answer system may not be able to discover enough evidence to support precise answers to the question.

BRIEF SUMMARY

According to one embodiment of the present disclosure, an approach is provided in which a knowledge manager identifies a first cohort type and a second cohort type corresponding to an entity included in a question. The knowledge manager determines inferred states to the question by comparing a first set of cohort attributes corresponding to a first cohort type against entity attributes corresponding to the question. In turn, the knowledge manager generates possible answers by comparing the inferred states against a second set of cohort attributes corresponding to a second cohort type.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
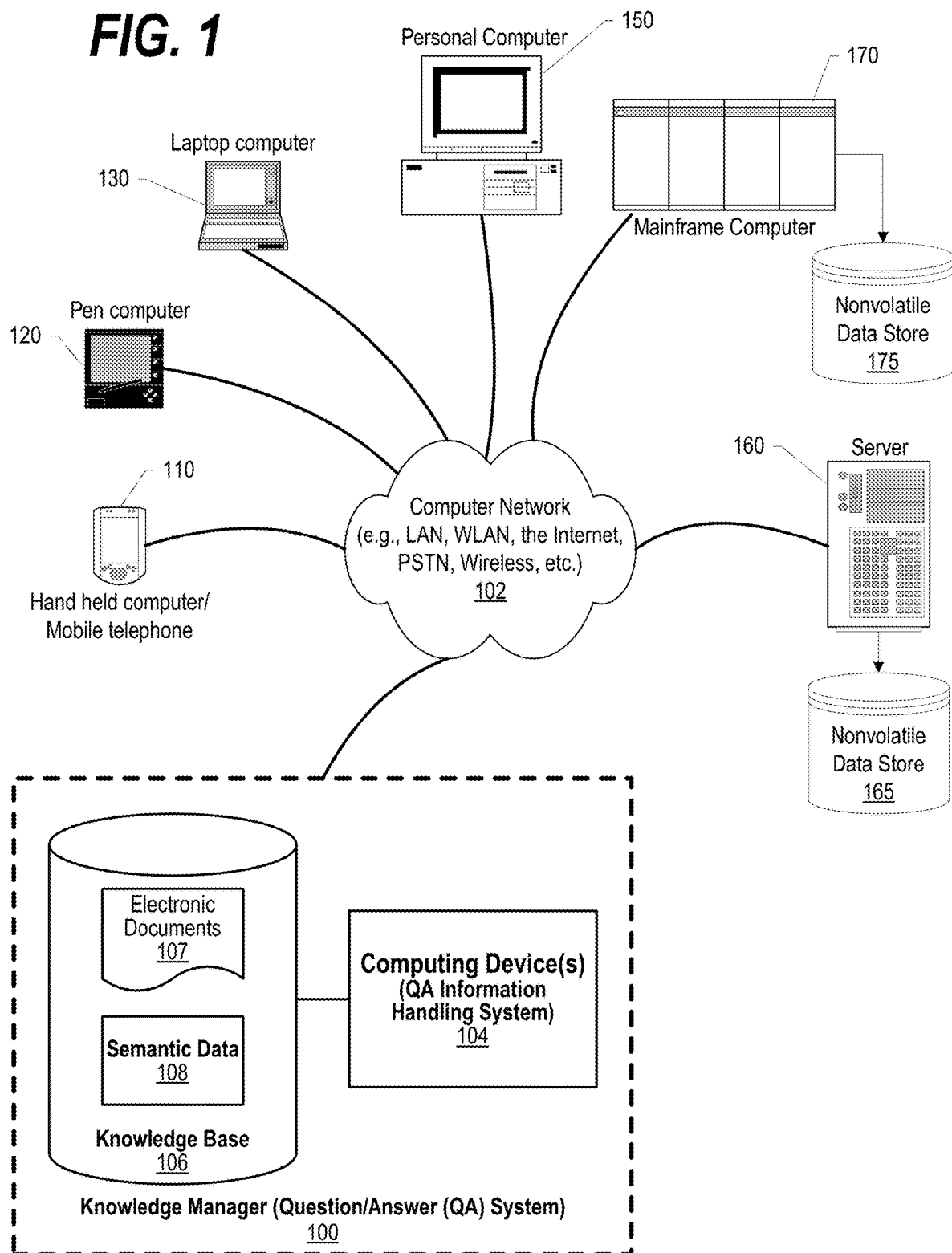
FIG. 1 depicts a schematic diagram of one illustrative embodiment of a knowledge manager system in a computer network.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, possible answer-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing possible answer information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, New York, which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize knowledge manager 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
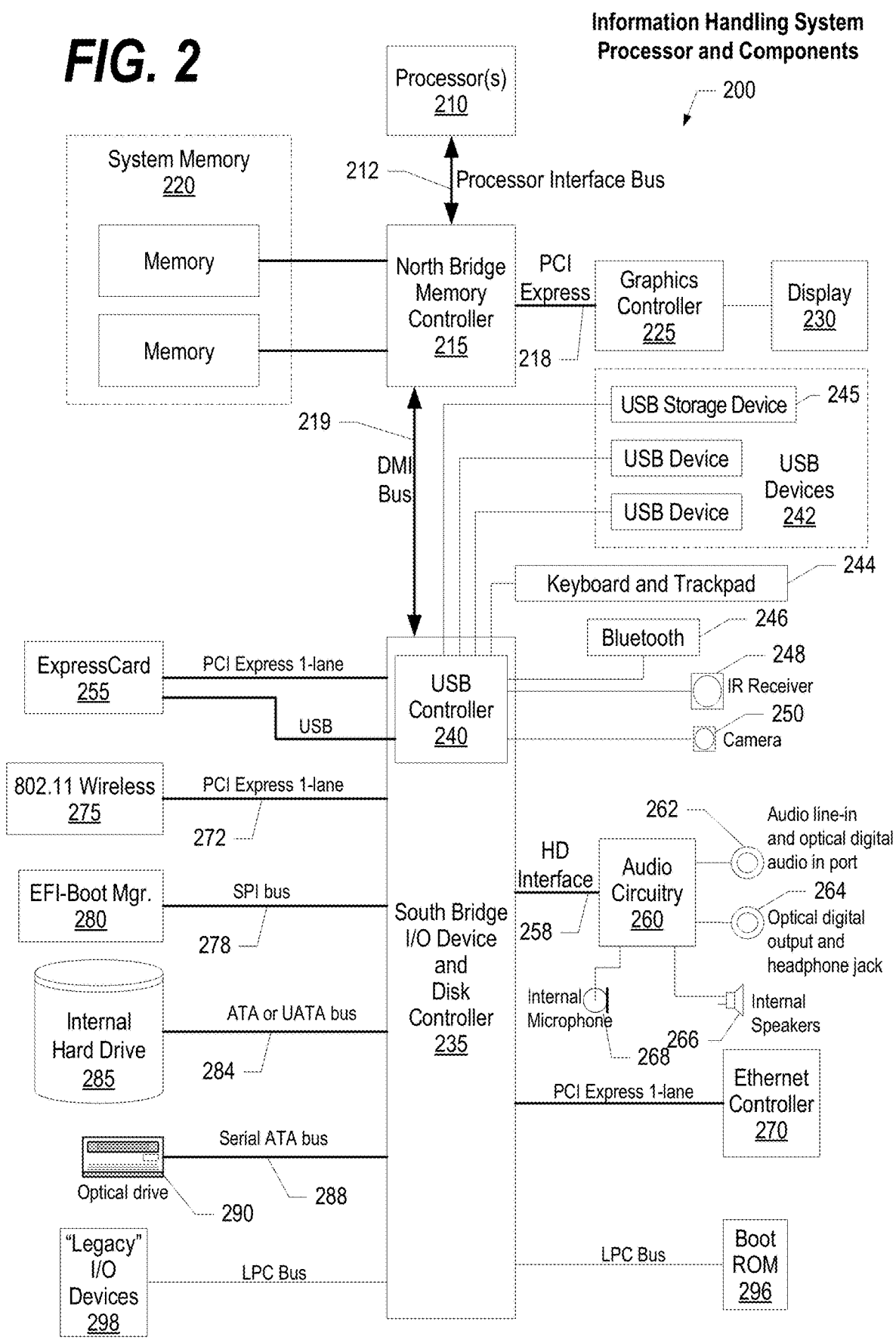
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-10 depict an approach that can be executed on an information handling system. The information handling system extracts entities from a question and identifies entity attributes of the entities using a knowledge graph. The information handling system assigns cohorts to the entities based upon the entity attributes, and uses the knowledge graph to discover cohort attributes for each of the assigned cohorts. The information handling system analyzes the cohort attributes against the entity attributes to identify possible states that establish a frame of reference to the question. In turn, the information handling system computes probability values for the possible states and generates possible answers to the question accordingly.

Figure 3:
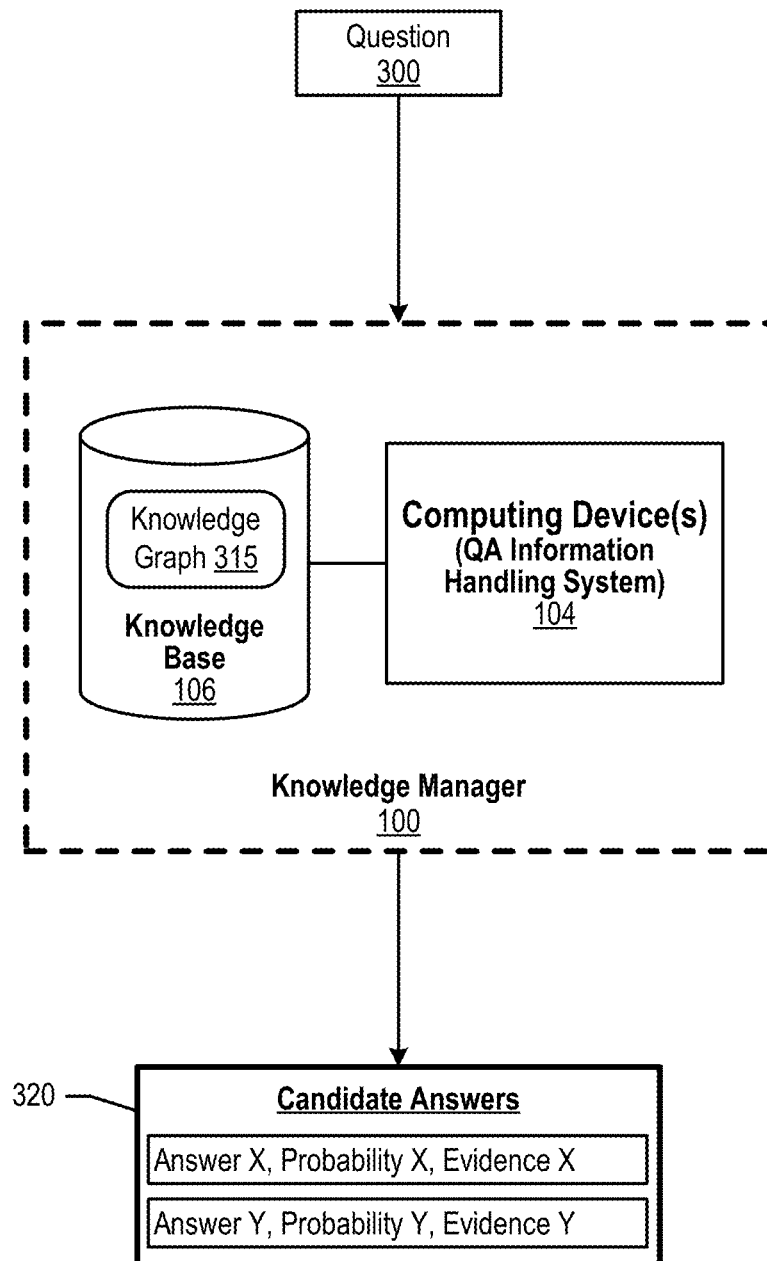
FIG. 3 is an exemplary diagram depicting a knowledge manager generating candidate answers for a question that lacks supporting facts in a knowledge base.

FIG. 3 is an exemplary diagram depicting a knowledge manager generating candidate answers for a question that lacks supporting facts in a knowledge base. Knowledge manager 100 is a question answer system that uses knowledge base 106 to answer questions. Knowledge base 106 includes a knowledge base of information created from a large corpus of documents. For example, knowledge base 106 may be a historical knowledge base developed from history books, literature, articles, publications, etc.

Knowledge manager 100 performs natural language processing on question 300 to understand question 300's context from a semantic and syntactic viewpoint. In turn, knowledge manager 100 accesses knowledge base 106 to search for a factual answer to question 300. For example, question 300 may be "When did George Washington die?" In this example, knowledge manager 100 accesses knowledge base 106 and locates a document (e.g., death certificate) that provides a factual answer as to when George Washington died.

At times, knowledge base 106 may not include a factual answer for a particular question, such as when knowledge base 106 is not fully complete or if a factual answer simply does not exist. For example, question 300 may ask "When did Vladimir Alexandrov die?" Vladimir Alexandrov was a Russian physicist that disappeared in 1985 and his whereabouts are unknown.

When knowledge base 106 does not include a factual answer to question 300, knowledge manager 100 extracts entities from question 300 (e.g., name, place, etc.) and discovers entity attributes of the entities using knowledge graph 315. Knowledge graph 315, in one embodiment, is a "mapping" of the information included in knowledge base 106. Using the example above, knowledge manager 100 uses knowledge graph 315 to locate documents that indicate Vladimir Alexandrov was a Russian physicist that disappeared in 1985, along with other attributes corresponding to Vladimir Alexandrov.

Knowledge manager 100 utilizes the entity attributes to determine cohort types corresponding to the entity. As those skilled in the art can appreciate, a cohort is a group of individuals having a common statistical factor. In one embodiment, knowledge manager 100 uses a hierarchical type system to identify cohort types corresponding to the entity. Using the example above, the knowledge manager 100 determines a cohort hierarchy for Vladimir Alexandrov of "Person->Russian->Russian Physicist" and assigns a human cohort type, a Russian cohort type, and a Russian Physicist cohort type to the entity (see FIG. 5 and corresponding text for further details).

Knowledge manager 100 proceeds to discover cohort attributes for each cohort type using knowledge graph 315. For example, knowledge manager 100 may discover a document in knowledge base 106 using knowledge graph 315 that includes a passage corresponding to the Russian cohort type of "Russian individuals have a high degree of defection in the 1970's and the 1980's." Knowledge manager 100, in turn, associates the discovered cohort attributes to their corresponding cohort type (see FIGS. 5, 9, and corresponding text for further details).

Figure 6:
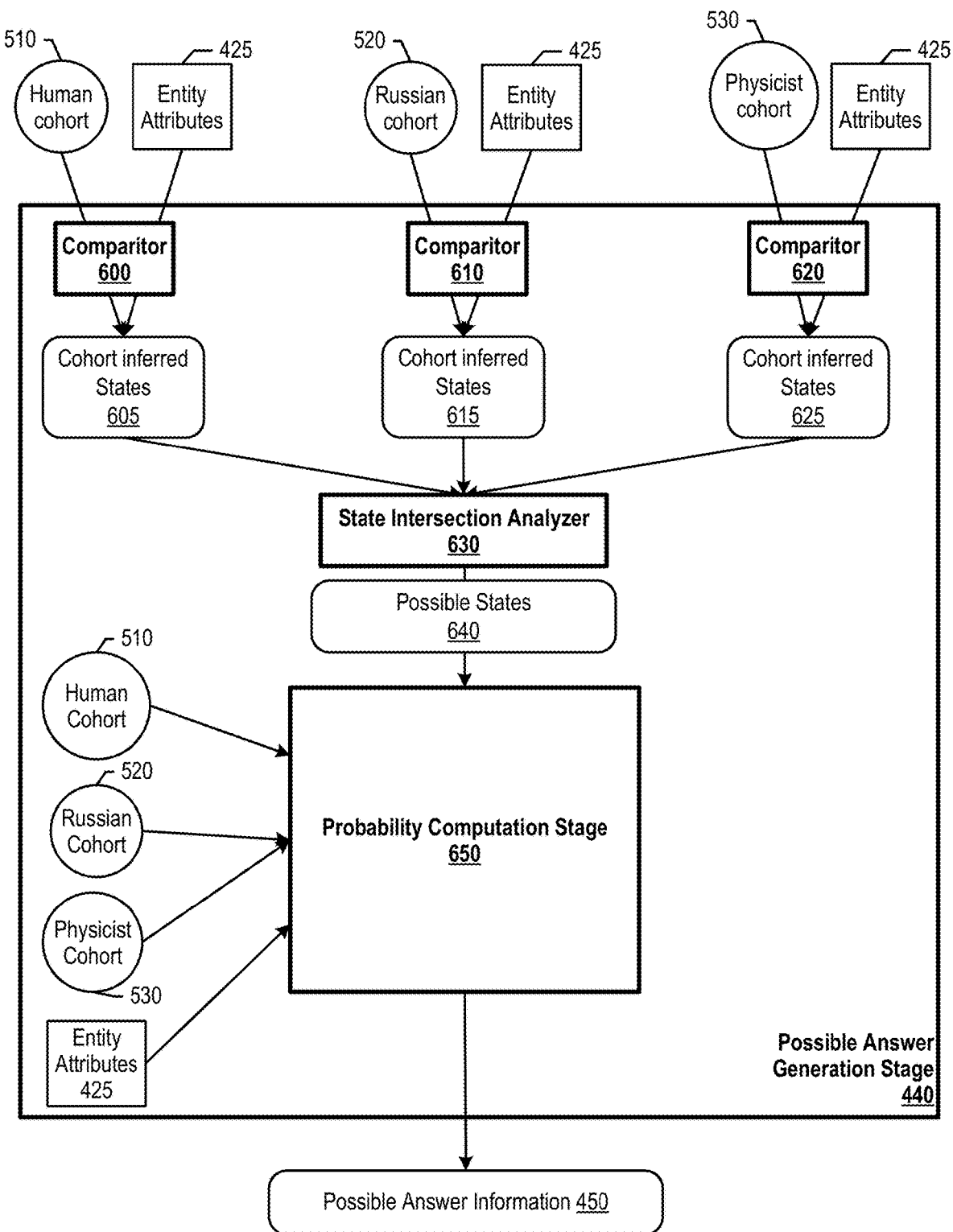
FIG. 6 is an exemplary diagram depicting a knowledge manager generating possible answers to a question based upon cohort attributes and entity attributes.

Knowledge manager 100 analyzes the cohort attributes in conjunction with the entity attributes to derive possible answer information for question 300 (see FIG. 6 and corresponding text for further details). Continuing with the example above, the entity attributes may include a fact that Vladimir Alexandrov disappeared in 1985 and, based on the Russian cohort characteristic that "Russian individuals have a high degree of defection in the 1970's and the 1980's," Knowledge manager 100 determines that a possible answer to question 300 with a high probability is that Vladimir Alexandrov defected in 1985 (see FIGS. 6, 9, 10, and corresponding text for further details).

In turn, knowledge manager 100 uses the possible answer information to generate and rank candidate answers 320, which include possible answers, their corresponding probability values, and evidence supporting the probability values. In one embodiment, the evidence includes links to specific document passages in knowledge base 106 so a user can review the actual passages to understand the rationale corresponding to a possible answer.

Figure 4:
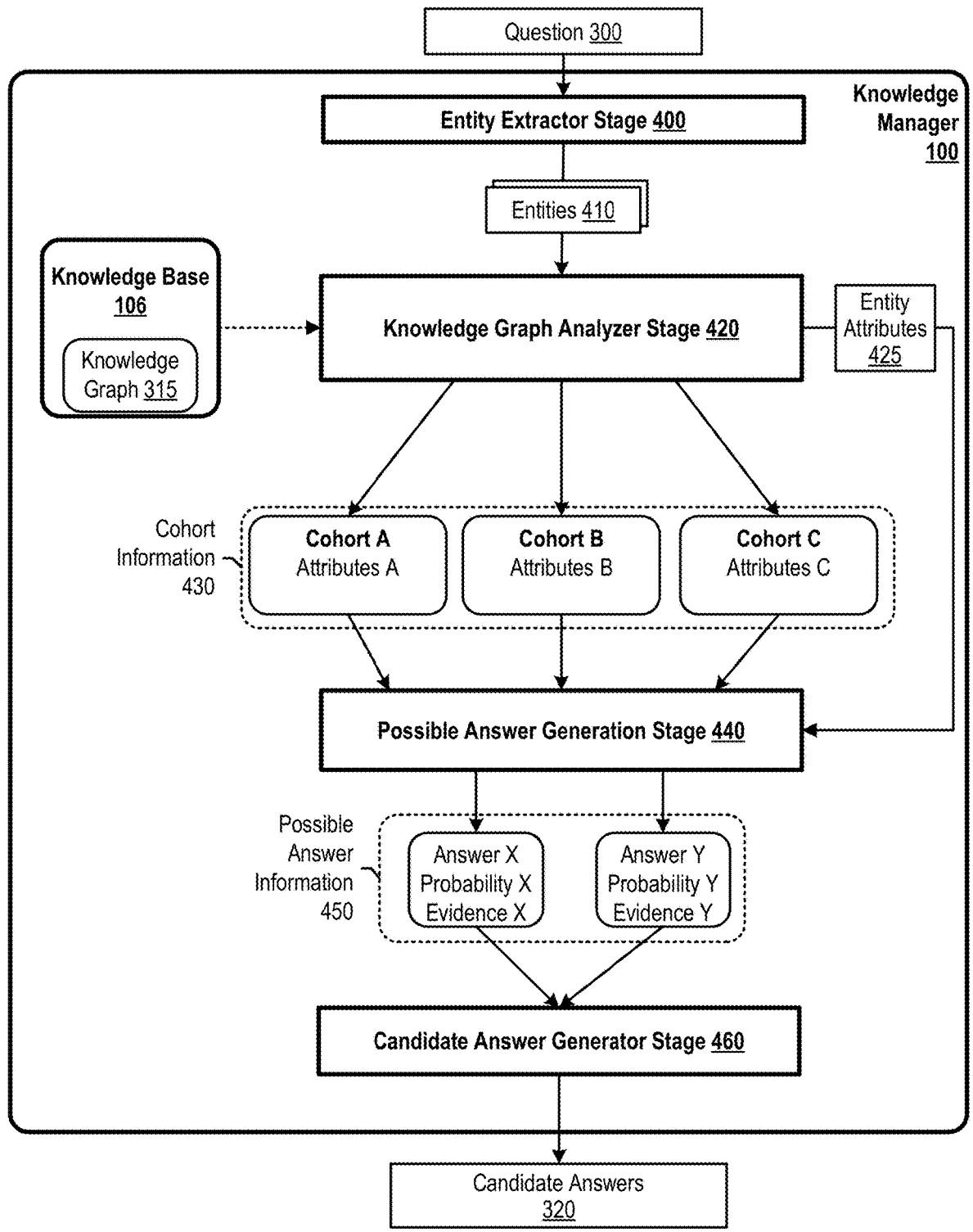
FIG. 4 is an exemplary diagram depicting stages within a knowledge manager that generate candidate answers to questions when a knowledge base lacks factual information.

FIG. 4 is an exemplary diagram depicting stages within a knowledge manager that generate candidate answers to questions when a knowledge base lacks factual information. As those skilled in the art can appreciate, knowledge manager 100 may have more or less stages, or different stage segmentations, than that shown in FIG. 4.

Entity extractor stage 400 extracts entities 410 from question 300, such as by using a named entity recognition (NER) algorithm that locates and classifies entities into pre-defined categories such as the names of persons, organizations, locations, expressions of times, quantities, monetary values, percentages, etc. In one embodiment, NER algorithms use linguistic grammar-based techniques as well as statistical models (e.g., machine learning) to locate and classify entities within question 300.

Knowledge graph analyzer stage 420 searches knowledge graph 315 for attributes pertaining to entities 410 (entity attributes 425). For example, for the entity "Vladimir Alexandrov," knowledge graph analyzer 420 discovers that Vladimir Alexandrov was a Russian, a Physicist, and disappeared in 1985 on his way to a conference in Madrid. From this discovery, knowledge graph analyzer 420 determines cohort types to assign the entities. In one embodiment, knowledge graph analyzer 420 uses a hierarchical type system to determine the cohort types for which to assign an entity. For example, knowledge graph analyzer 420 may generate a hierarchy type of "Person->Russian->Russian Physicist" for Vladimir Alexandrov and, in turn, assign three cohort types of Person, Russian, and Russian Physicist to Vladimir Alexandrov.

Once knowledge graph analyzer 420 assigns the cohort types to entities 410, knowledge graph analyzer 420 uses knowledge graph 315 to discover cohort attributes for each cohort type. Using the example above, knowledge graph analyzer 420 may discover a human cohort attribute of "the average life expectancy of males is 72 years." In one embodiment, knowledge graph analyzer 420 prioritizes the cohort types in order of importance. For example, if Vladimir Alexandrov is 90 years old, the human cohort type may the most relevant cohort type, which factors in to computing probability values to possible answers. Knowledge graph analyzer 420 provides entity attributes 425 and cohort information 430, which includes cohort types and cohort attributes, to possible answer generation stage 440 for further analysis.

Possible answer generation stage 440 analyzes cohort information 430 in conjunction with entity attributes 425 to determine possible states of question 300 that correspond to possible answers. Continuing with the example above, possible states to question 300 may be 1) died in 1985, 2) defected and still alive, 3) defected and died after 1985. Possible answer generation stage 440 then computes probability values for each of the possible states based upon the cohort attributes and the entity attributes.

In one embodiment, as discussed above, possible answer generation state 440 may increase weightings to cohort types that are highly relevant. For example, possible answer generation stage 440 may place a high weighting value on human cohort attributes if Vladimir Alexandrov is 90 years old. In turn, possible answer generation stage 440 generates possible answer information 450, which includes possible answers, their corresponding probability values, and evidence to support the possible answers and probability values, such as links to document passages.

Candidate answer generator 460 receives possible answer information 450 and ranks the possible answers accordingly. For example, candidate answer generator 460 may rank the possible answers in order of their probability values. In turn, candidate answer generator 460 provides candidate answers 320 that, in one embodiment, include the ranked answers, their probability values, and the evidence supporting the probability values.

Figure 5:
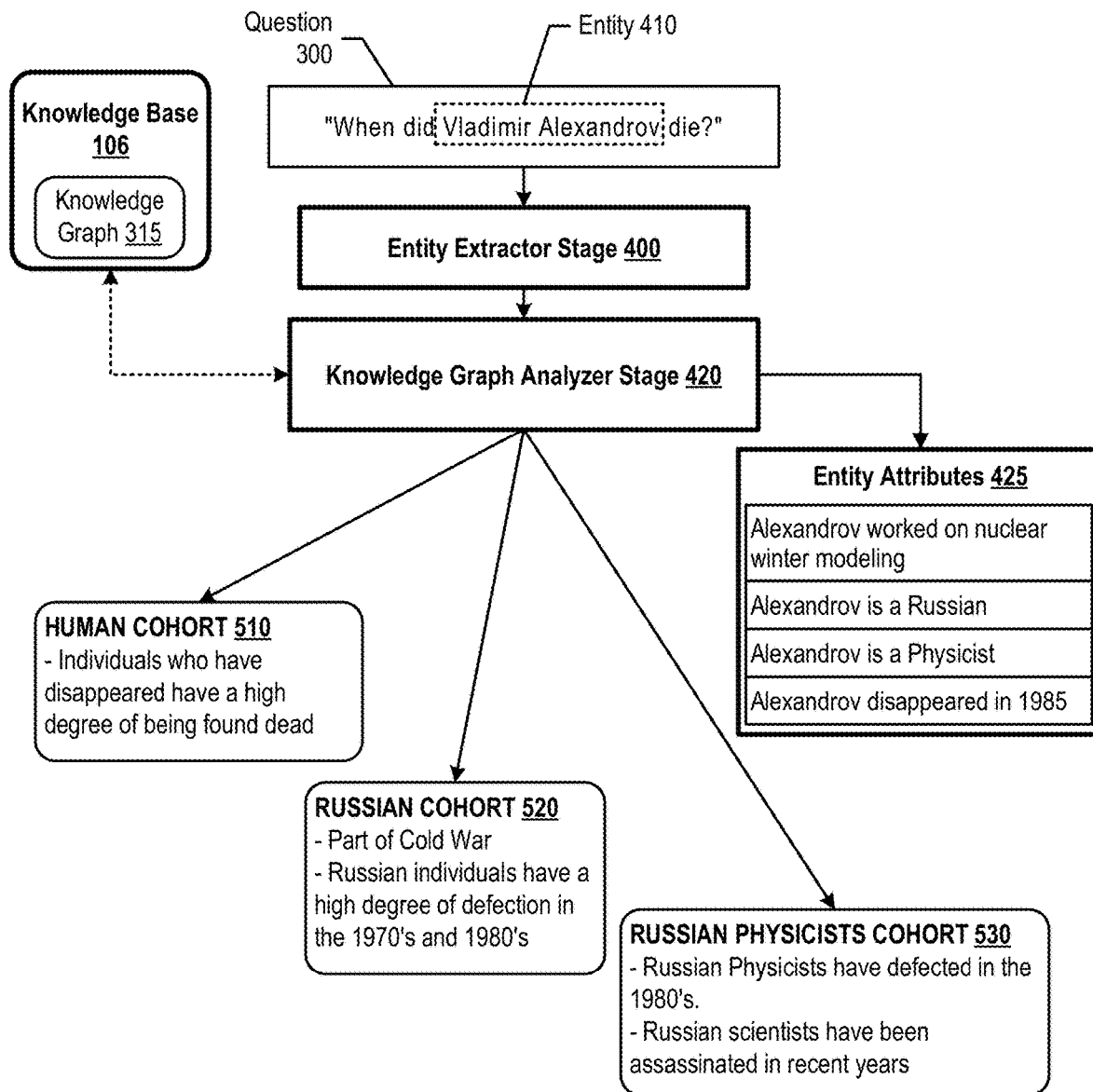
FIG. 5 is an exemplary diagram depicting an example of a knowledge graph analyzer stage discovering entity attributes and cohort attributes corresponding to an entity extracted from a question.

FIG. 5 is an exemplary diagram depicting an example of a knowledge graph analyzer stage discovering entity attributes and cohort attributes corresponding to an entity extracted from a question. Knowledge manager 100 receives question 300 of "When did Vladimir Alexandrov die?" Knowledge manager 100 attempts to answer the question using a database such as knowledge base 106. However, knowledge base 106 does not include facts to provide a factual answer to question 300.

As such, entity extractor stage 400 identifies entity 410 ("Vladimir Alexandrov"), such as with NER algorithms, and provides entity 410 to knowledge graph analyzer stage 420. Knowledge graph analyzer stage 420 accesses knowledge base 106 to collect entity attributes corresponding to entity 410 and determines that Vladimir Alexandrov was a Russian Physicist whose work centered on climate modeling in the late 1970s and 1980s. At the time of his disappearance in 1985, Vladimir Alexandrov worked on nuclear winter modeling and disappeared on his way to attending a conference in Madrid (entity attributes 425).

Knowledge graph analyzer stage 420 then identifies cohort types corresponding to the entity attributes, such as by using a hierarchical type system, and determines a cohort hierarchy of "Person->Russian->Russian Physicist." As such, knowledge graph analyzer stage 420 assigns three cohort types to entity 410 of human cohort 510, Russian cohort 520, and Russian Physicist cohort 530.

Knowledge graph analyzer stage 420 in turn, searches knowledge graph 315 to discover cohort attributes for each cohort type. Regarding human cohort 510, knowledge graph analyzer stage 420 discovers that individuals who have disappeared have a high degree of dying. Regarding Russian cohort 520, knowledge graph analyzer stage 420 discovers that Russia was a part of the Cold War with the United States (~1947-~1991) and that Russian individuals had a high degree of defecting in the 1970's and 1980's. Finally, knowledge graph analyzer stage 420 discovers that Russian physicists defected in the 1980s, and that Russian Scientists have been assassinated in recent years.

Possible answer generation stage 440 evaluates entity attributes 425 in conjunction with cohorts 510, 520, and 530, to establish a frame of reference for which to determine possible answers to question 300 (see FIG. 6 and corresponding text for further details).

FIG. 6 is an exemplary diagram depicting a knowledge manager generating possible answers to a question based upon cohort attributes and entity attributes. Possible answer generation stage 440 receives entity attributes 425, cohort information 510, cohort information 520, and cohort information 530 from knowledge graph analyzer stage 420, and individually compares entity attributes 425 to each of the cohort information. As discussed herein for simplicity purposes, "cohort information" includes a cohort type and corresponding cohort attributes discovered by knowledge graph analyzer stage 420.

Comparator 600 compares human cohort 510 to entity attributes 425 to produce cohort inferred states 605, which includes one or more possible states based upon human cohort 510's attributes compared against entity attributes 425. For example, a cohort inferred state may be "deceased." Comparator 610 compares Russian cohort 520 to entity attributes 425 to produce cohort inferred states 615, which includes one or more possible states based upon Russian cohort 510 compared against entity attributes 425 (e.g., defected). Comparator 620 compares physicist cohort 530 to entity attributes 425 to produce cohort inferred states 625, which includes one or more possible states based upon Physicist cohort 510 compared against entity attributes 425 (e.g. assassinated).

Probability computation stage 650 evaluates cohort inferred states 605, 610, and 625 to determine their feasibility by applying a temporal aspect using information included in entity attributes 425 along with cohort attribute information from to other cohort types. For example, probability computation stage 650 determines the feasibility of cohort inferred states 605 based upon entity attributes 425 and cohort attributes corresponding to the Russian cohort type and the Russian Physicist type.

Figure 10:
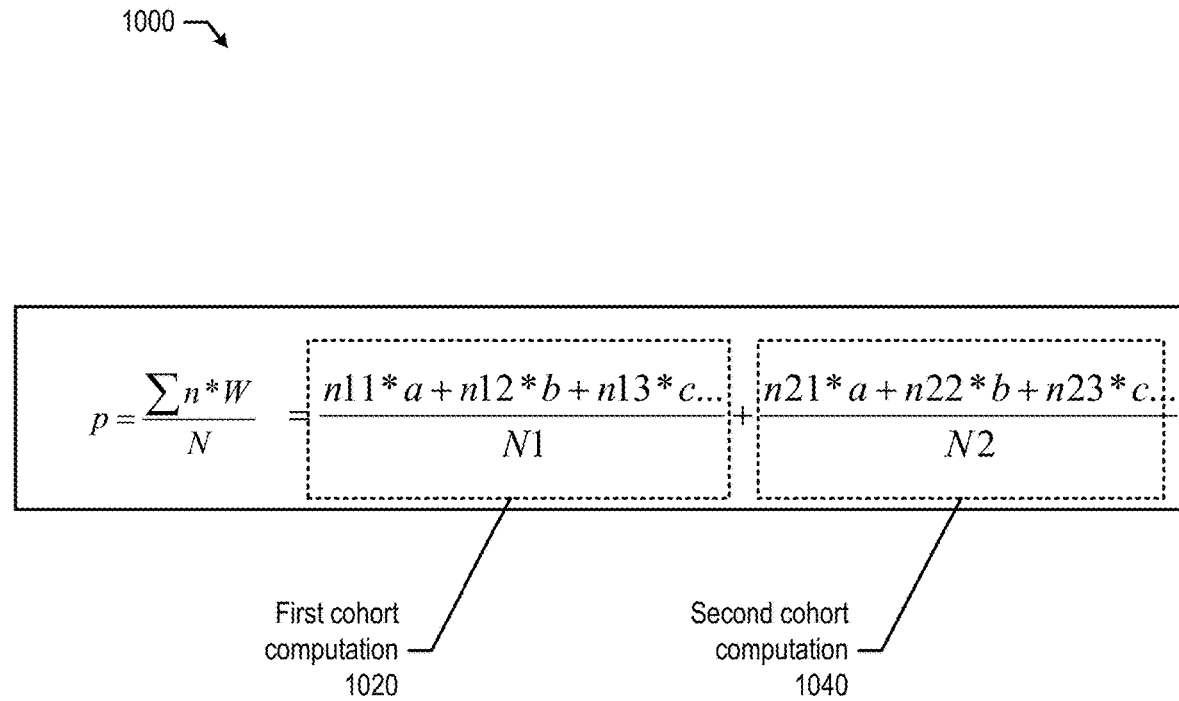
FIG. 10 is an exemplary formula to compute probability values of possible answers.

In turn, probability computation stage 650 generates probability values for the cohort inferred states based upon their feasibility. For example, given a "defect" state, probability computation stage 650 searches to establish factors surrounding the defect state such as:

How many times defection occurred in each group in each year (1980~1990) (n)
Total number of people in each group (N)
Weight given to each year (W)
Probability computation stage 650 determines that Vladimir Alexandrov disappeared in 1985 and, this example, gives weight to years as follow (similar to decaying sum):
1985: highest weight (a)
1984, 1986: 2nd-highest weight (b)
1983, 1987: 3rd-highest weight (c)
1982, 1988: 4th-highest weight (d)
1981, 1989: 5th-highest weight (e)
1980, 1990: 6th-highest weight (f)
Probability computation stage 650, in turn, generates possible answer information 450 that includes the possible answers, their probability values, and supporting evidence (see FIG. 10 and corresponding text for further details).

Figure 7:
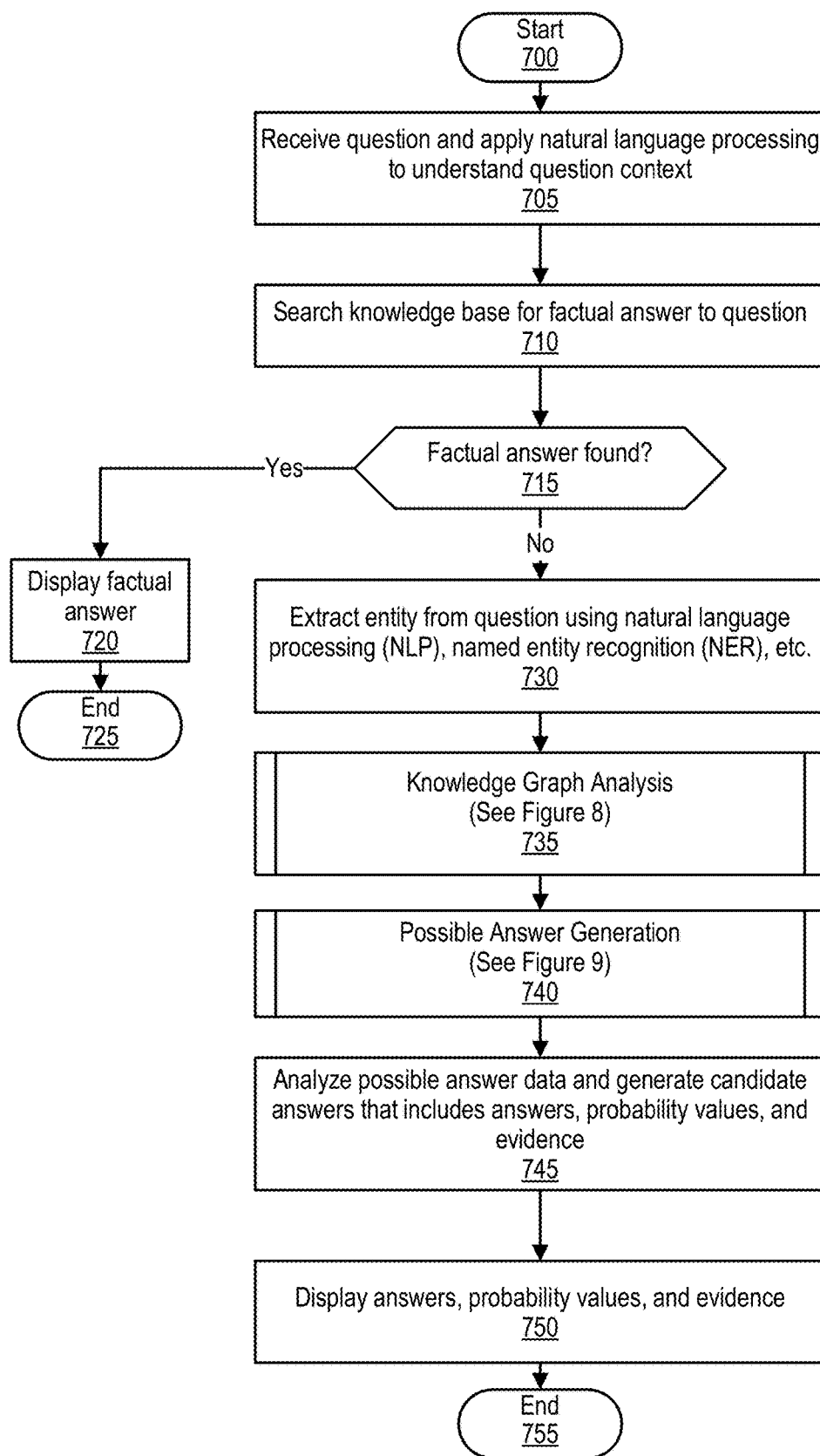
FIG. 7 is an exemplary flowchart depicting steps taken by a knowledge manager to answer a question when a knowledge base lacks factual information.

FIG. 7 is an exemplary flowchart depicting steps taken by a knowledge manager to answer a question when a knowledge base lacks factual information. Processing commences at 700, whereupon the process receives a question and uses natural language processing algorithms to determine the context of the question.

At step 710, the process searches knowledge base 106 for an exact factual answer to the question. Knowledge base 106 may be specific to a particular industry, such as the medical industry, financial industry, etc., and question 300 is specific to the same industry. The process determines as to whether an exact factual answer exists in knowledge base 106 (decision 715). For example, if the question is "How much did the stock market change from 1990-2000?" the process may locate a factual answer in a financial journal. If the process finds a factual answer, then decision 715 branches to the 'yes' branch. At step 720, the process provides the exact factual answer, and FIG. 7 processing thereafter ends at 725.

On the other hand, if the process did not find a factual answer, then decision 715 branches to the 'no' branch. For example, the question may not have a factual answer, such as "How many gallons of water are in the Pacific Ocean?" As such, the process narrows down the scope of possible answers by identifying entities within the question and associating cohorts to the entities to establish a frame of reference in which to answer the question (discussed below).

At step 730, the process extracts the entity, or entities, from the question using techniques based on, for example, named entity recognition (NER) algorithms, etc. The NER algorithms locate entities in the question and classify the entities into pre-defined categories. At predefined process 735, the process identifies entity attributes corresponding to the entity using a knowledge graph and, in turn, uses the entity attributes to identify cohorts and corresponding cohort attributes using the knowledge graph. (see FIG. 8 and corresponding text for processing details).

At predefined process 740, the process generates possible answer information based upon entity attributes and cohort attributes discovered in pre-defined process block 735. In one embodiment, the possible answer information includes possible answers, probability values, and supporting evidence (see FIG. 9 and corresponding text for further details).

At step 745, the process analyzes the possible answer information to generate and rank candidate answers accordingly. At step 750, the process displays the candidate answers, the probability values, and evidence that support the probability values. FIG. 7 processing thereafter ends at 755.

Figure 8:
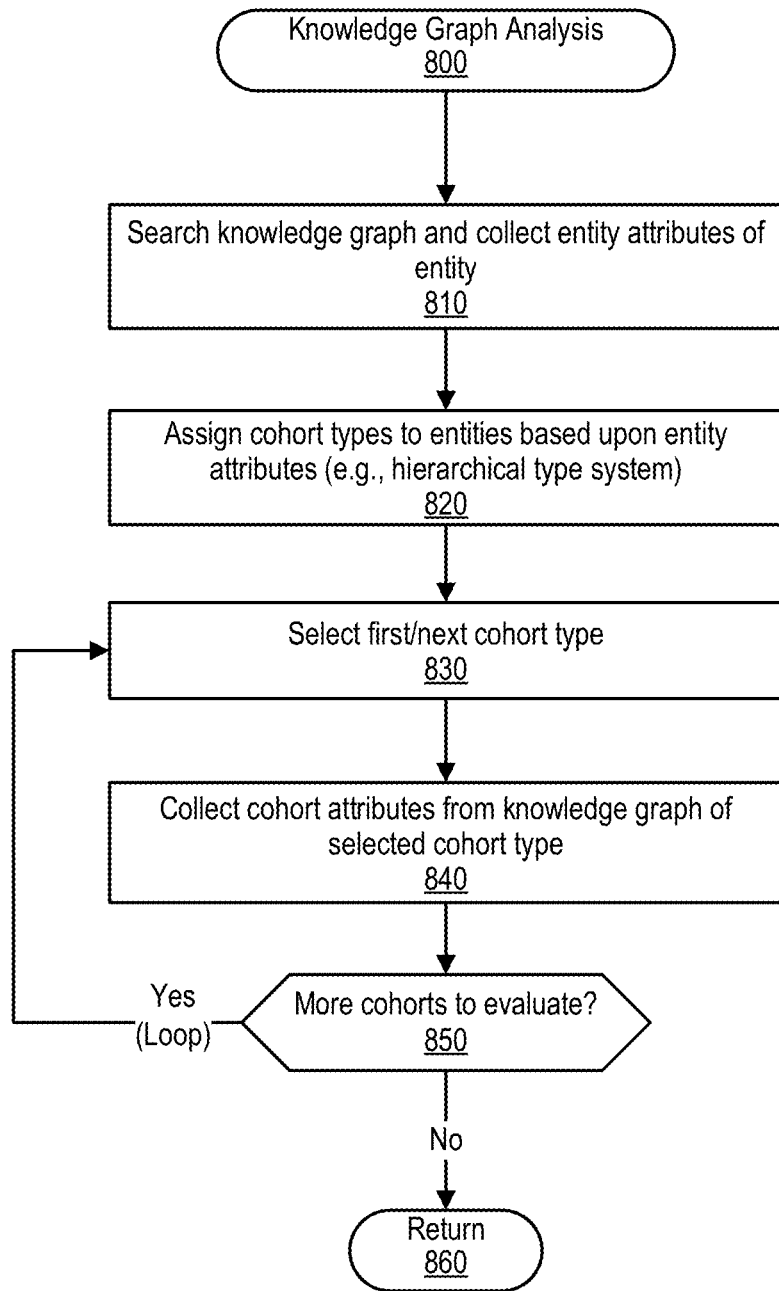
FIG. 8 is an exemplary flowchart depicting steps taken by a knowledge manager to use a knowledge graph to discover entity attributes and cohort attributes.

FIG. 8 is an exemplary flowchart depicting steps taken by a knowledge manager to use a knowledge graph to discover entity attributes and cohort attributes. Processing commences at 800, whereupon the process searches knowledge graph 315 and discovers entity attributes at step 810 corresponding to entities extracted in FIG. 7. At step 820, the process analyzes the entity attributes and determines cohort types to assign to the entities, such as by using a hierarchical type system as discussed herein.

At step 830, the process selects the first cohort type and, at step 840, the process traverses knowledge graph 315 to discover cohort attributes of the selected cohort type. In one embodiment, the knowledge graph is a graph database and each node in the graph represents an entity. In this embodiment, the attribute discovery phase attaches curated/domain knowledge information to the nodes and the process traverses the graph database to identify nodes with a particular type and extract the attributes attached to the identified nodes. The process, in turn, determines a cohort attribute consensus across the entities of a particular cohort type.

The process determines as to whether there are more cohort types to evaluate (decision 850). If there are more cohort types to evaluate, then decision 850 branches to the 'yes' branch. On the other hand, if there are no more cohort types to evaluate, then decision 850 branches to the 'no' branch, whereupon processing returns to the calling routine (see FIG. 7 at 860).

Figure 9:
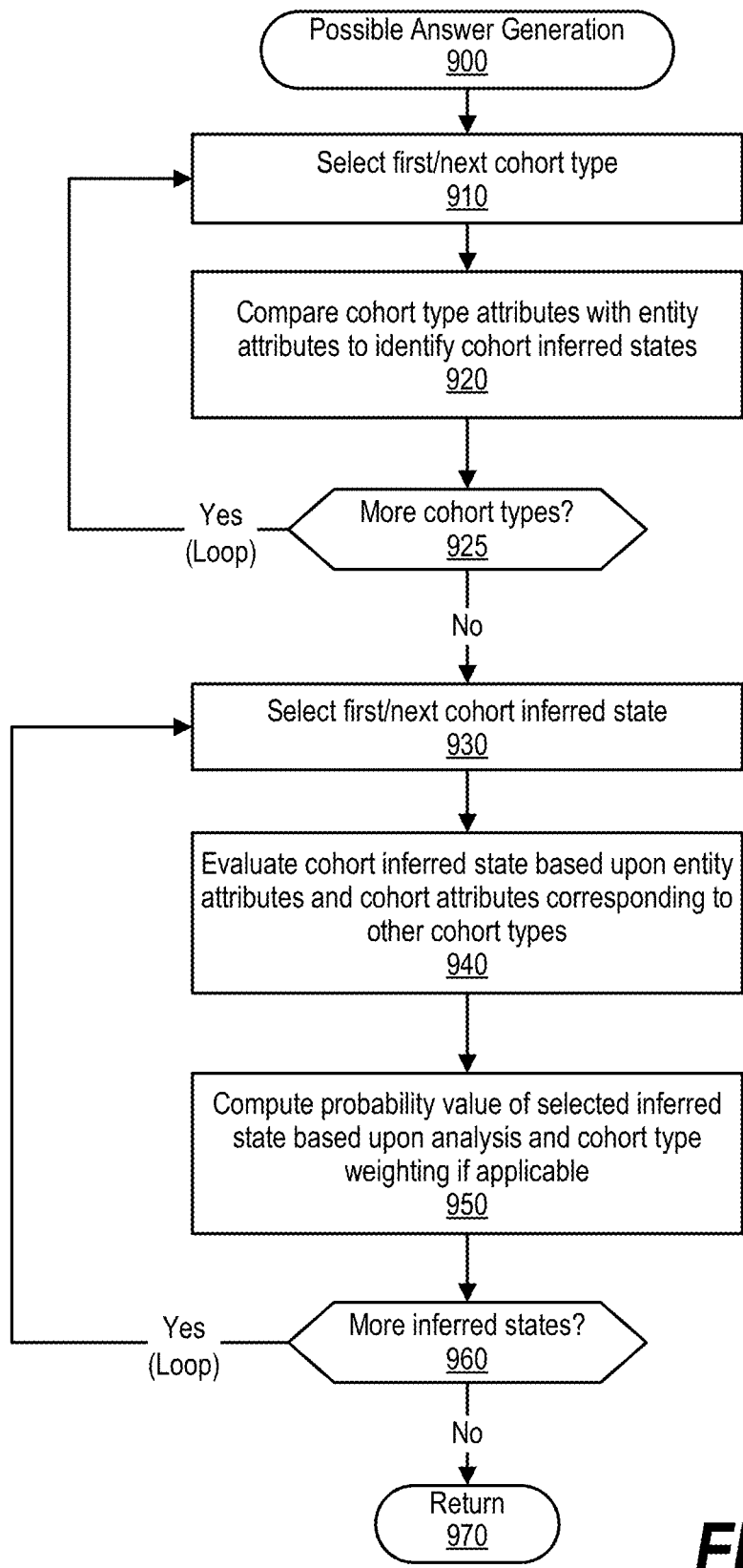
FIG. 9 is an exemplary diagram depicting steps taken by a knowledge manager to compute possible answer information based upon entity attributes and cohort attributes.

FIG. 9 is an exemplary diagram depicting steps taken by a knowledge manager to compute possible answer information based upon entity attributes and cohort attributes. Processing commences at 900, whereupon the process selects a first cohort type identified in FIG. 8 (step 910). At step 920, the process compares the selected cohort type's attributes with entity attributes 425 corresponding to the user to identify cohort inferred states corresponding to the selected cohort type, such as defected, deceased, etc. In one embodiment, the process cross-evaluates the cohort inferred states with cohort attributes corresponding to other cohort types and known information from in entity attributes 425 (discussed below).

The process determines as to whether there are more cohort types for which to generate cohort inferred states (decision 925). If there are more cohort types to evaluate, decision 925 branches to the 'yes' branch, which loops back to select and process the next cohort type. This looping continues until there are no more cohort types for which to generate inferred states, at which point decision 925 branches to the 'no' branch.

At step 930, the process selects the first cohort inferred state and, at step 940, the process evaluates the cohort inferred state based upon entity attributes 425 and cohort attributes corresponding to other cohort types. Using entity 410 shown in FIG. 4 as an example, the process evaluates a human cohort type 510 inferred state based upon entity attributes 425 and cohort attributes corresponding to the Russian cohort type 520 and the Russian Physicist cohort type 530.

At step 950, the process computes a probability value of the selected inferred state based upon appropriate entity attributes and cohort attributes, such as by using formula 1000 shown in FIG. 10. In one embodiment, the process assigns weightings to cohort types to increase or decrease their influence in the overall probability computation, such as increasing a human cohort type weighting when a person is 90 years old as discussed earlier.

The process determines as to whether there are more inferred states to evaluate (decision 960). If there are more inferred states to evaluate, then decision 950 branches to the 'yes' branch. On the other hand, if there are not more possible states to evaluate, then decision 960 branches to the 'no' branch. FIG. 9 processing thereafter returns to the calling routine (see FIG. 7) at 970.

FIG. 10 is an exemplary formula to compute probability values of possible answers. As those skilled in the art can appreciate, other formulas besides formula 1000 may be used to compute probability values.

Formula 1000 corresponds to FIG. 6's discussion and include the formulas:
p=Probability value of a state.
n=Number of times defection occurred in each cohort in each year (1980~1990)
N=Total number of people in each cohort
W=Weight given to each year For each possible state, knowledge manager 100 computes probability values based on the entity attributes and attribute information of each cohort. For example, to compute a probability value that Vladimir Alexandrov defected, first cohort computation 1020 computes a probability that Russian cohort individuals defected around when Vladimir Alexandrov disappeared, second cohort computation 1030 computes the probability that Russian Physicists defected around when Vladimir Alexandrov disappeared, etc. In turn, knowledge manager 100 generates and ranks candidate answers based on the computed probability values, such as by ranking the possible answers in order of highest probability values.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:
1. An information handling system comprising:
one or more processors;
a memory coupled to at least one of the processors; and a set of computer program instructions stored in the memory and executed by at least one of the processors in order to perform actions of:
- receiving a question that comprises an entity;
- determining a deficiency of factual information in a knowledge base to the question;
- in response to determining the deficiency of factual information:
  - identifying one or more entity attributes by traversing a knowledge graph corresponding to the knowledge base;
  - selecting a plurality of cohort types corresponding to the entity based upon the one or more entity attributes, wherein the plurality of cohort types include a first cohort type and a second cohort type that is different from the first cohort type;
  - determining one or more inferred states to the question by comparing a first set of cohort attributes corresponding to the first cohort type against the one or more entity attributes corresponding to the entity;
  - in response to the determining of the one or more inferred states, evaluating the one or more inferred states against a second set of cohort attributes corresponding to the second cohort type;
  - in response to the evaluating, generating one or more possible answers to the question, wherein the one or more possible answers are based on an inference between the entity, the first cohort, and the second cohort; and
  - providing the possible answers to a user.

2. The information handling system of claim 1 wherein the one or more processors perform additional actions comprising:
- computing one of a plurality of probability values for each of the one or more possible answers based upon evaluating the one or more possible answers against the one or more entity attributes; and
- ranking the one or more possible answers based upon the plurality of probability values.

3. The information handling system of claim 2 wherein the one or more processors perform additional actions comprising:
- assigning a weighting value to one of the plurality of cohort types based upon the one or more entity attributes; and
- factoring the assigned weighting value into the computing of at least one of the plurality of probability values.

4. The information handling system of claim 2 wherein the one or more processors perform additional actions comprising:
- generating one or more candidate answers corresponding to the one or more possible answers, wherein each of the one or more candidate answers include a corresponding one of the plurality of probability values and at least one document link that identifies a document that supports the corresponding probability value.

5. The information handling system of claim 1 wherein the one or more processors perform additional actions comprising:
- traversing the knowledge graph to locate the first set of cohort attributes and the second set of cohort attributes.

6. The information handling system of claim 1 wherein each of the plurality of cohort types corresponds to a grouping of individuals having a common statistical factor.

7. A computer program product stored in a computer readable storage medium, comprising computer program code that, when executed by an information handling system, causes the information handling system to perform actions comprising:
- receiving a question that comprises an entity;
- determining a deficiency of factual information in a knowledge base to the question;
- in response to determining the deficiency of factual information:
  - identifying one or more entity attributes by traversing a knowledge graph corresponding to the knowledge base;
  - selecting a plurality of cohort types corresponding to the entity based upon the one or more entity attributes, wherein the plurality of cohort types include a first cohort type and a second cohort type that is different from the first cohort type;
  - determining one or more inferred states to the question by comparing a first set of cohort attributes corresponding to the first cohort type against the one or more entity attributes corresponding to the entity;
  - in response to the determining of the one or more inferred states, evaluating the one or more inferred states against a second set of cohort attributes corresponding to the second cohort type;
  - in response to the evaluating, generating one or more possible answers to the question, wherein the one or more possible answers are based on an inference between the entity, the first cohort, and the second cohort; and
  - providing the possible answers to a user.

8. The computer program product of claim 7 wherein the information handling system performs additional actions comprising:
- computing one of a plurality of probability values for each of the one or more possible answers based upon evaluating the one or more possible answers against the one or more entity attributes; and
- ranking the one or more possible answers based upon the plurality of probability values.

9. The computer program product of claim 8 wherein the information handling system performs additional actions comprising:
- assigning a weighting value to one of the plurality of cohort types based upon the one or more entity attributes; and
- factoring the assigned weighting value into the computing of at least one of the plurality of probability values.

10. The computer program product of claim 8 wherein the information handling system performs additional actions comprising:
- generating one or more candidate answers corresponding to the one or more possible answers, wherein each of the one or more candidate answers include a corresponding one of the plurality of probability values and at least one document link that identifies a document that supports the corresponding probability value.

11. The computer program product of claim 7 wherein the information handling system performs additional actions comprising:
- traversing the knowledge graph to locate the first set of cohort attributes and the second set of cohort attributes.

12. The computer program product of claim 7 wherein each of the plurality of cohort types corresponds to a grouping of individuals having a common statistical factor.

* * * * *